US009001402B2

(12) United States Patent
Rumreich (10) Patent No.: US 9,001,402 B2
(45) Date of Patent: Apr. 7, 2015

(54) VARIABLE AND SERRATED SCANNING IN LASER PROJECTORS

(75) Inventor: Mark Francis Rumreich, Indianapolis, IN (US)

(73) Assignee: Thomson Licensing, Issy-les Moulineaux (FR)

( * ) Notice: Subject to any disclaimer, the term of this patent is extended or adjusted under 35 U.S.C. 154(b) by 7 days.

(21) Appl. No.: 14/123,741

(22) PCT Filed: May 24, 2012

(86) PCT No.: PCT/US2012/039408
§ 371 (c)(1),
(2), (4) Date: Dec. 3, 2013

(87) PCT Pub. No.: WO2012/166536
PCT Pub. Date: Dec. 6, 2012

(65) Prior Publication Data
US 2014/0098302 A1    Apr. 10, 2014

Related U.S. Application Data (60) Provisional application No. 61/520,067, filed on Jun. 3, 2011.

(51) Int. Cl.
*G02B 26/08*   (2006.01)
*H04N 9/31*    (2006.01)
(Continued)

(52) U.S. Cl.
CPC .......... *H04N 9/3135* (2013.01); *H04N 5/2628* (2013.01); *H04N 5/74* (2013.01); *G09G 3/002* (2013.01); *G09G 2320/0626* (2013.01); *G09G 2360/16* (2013.01); *G09G 3/025* (2013.01)

(58) Field of Classification Search
CPC ..... H04N 9/3129; H04N 5/74; H04N 5/2628; H04N 9/3135; G02B 26/101; G02B 26/105; G09G 3/025; G09G 2320/0626; G09G 2360/16; G09G 3/002
USPC ............... 359/198.1–199.4, 213.1–215.1, 359/201.1–202.1, 204.1–204.2, 204.4; 353/69, 98–99, 30–31
See application file for complete search history.

(56) References Cited

U.S. PATENT DOCUMENTS

| | | | |
|---|---|---|---|
| 3,941,996 A | 3/1976 | Stauffer | |
| 6,515,781 B2 | 2/2003 | Lewis et al. | |

(Continued)

FOREIGN PATENT DOCUMENTS

| | | |
|---|---|---|
| CN | 2879313 Y | 3/2007 |
| CN | 201689258 U | 12/2010 |

(Continued)

OTHER PUBLICATIONS

Khan et al., "A low-resolution 3D holographic volumetric display," Proc. of SPIE 2010, vol. 7723, pp. 77231B-1 to 77231B-7.
(Continued)

*Primary Examiner* — James Phan
(74) *Attorney, Agent, or Firm* — Robert D. Shedd; Richard LaPeruta (57) ABSTRACT

A miniature projector is provided that comprises: a means for providing at least three different light beams of different color; and a means for scanning the light beams; wherein the scanning means is adapted to scan the light beams according to a pattern from a first edge to an ending edge in the screen to form an image, the pattern being a wave pattern of scan lines such that amplitudes oscillates along a first axis as the beams progressively scan along a second axis, the second axis being perpendicular to the first axis, and wherein the wave pattern is a composite of a vertical scan profile and horizontal scan profile and the vertical scan profile has a cyclic wobulation corresponding to the amplitudes.

26 Claims, 8 Drawing Sheets

(51) Int. Cl.
*H04N 5/262* (2006.01)
*H04N 5/74* (2006.01)
*G09G 3/02* (2006.01)
*G09G 3/00* (2006.01)

(56) References Cited

U.S. PATENT DOCUMENTS

| | | | |
|---|---|---|---|
| 6,600,168 | B1 | 7/2003 | Geng |
| 7,049,585 | B2 | 5/2006 | Nakasuji et al. |
| 7,252,394 | B1 | 8/2007 | Fu |
| 7,312,919 | B2 | 12/2007 | Overbeck |
| 7,334,901 | B2 | 2/2008 | El-Ghoroury |
| 7,385,180 | B2 | 6/2008 | Rueb et al. |
| 7,486,274 | B2 | 2/2009 | Forlines et al. |
| 7,859,567 | B2 | 12/2010 | He et al. |
| 7,986,340 | B2 | 7/2011 | He et al. |
| 8,384,775 | B2 | 2/2013 | Yamazaki |
| 2002/0071287 | A1 | 6/2002 | Haase |
| 2002/0154396 | A1 | 10/2002 | Overbeck |
| 2004/0119004 | A1 | 6/2004 | Wine et al. |
| 2004/0136204 | A1 | 7/2004 | Asao |
| 2007/0035508 | A1 | 2/2007 | Yamazaki et al. |
| 2007/0070310 | A1 | 3/2007 | Ryu et al. |
| 2007/0229668 | A1 | 10/2007 | He et al. |
| 2008/0247165 | A1 | 10/2008 | Schultz |
| 2009/0021801 | A1 | 1/2009 | Ishihara |
| 2010/0182668 | A1 | 7/2010 | Abe et al. |
| 2010/0259511 | A1 | 10/2010 | Kimura et al. |
| 2010/0275496 | A1 | 11/2010 | Solinsky et al. |
| 2011/0063527 | A1 | 3/2011 | He et al. |
| 2011/0069363 | A1 | 3/2011 | Chikaoka et al. |
| 2011/0141441 | A1* | 6/2011 | Konno et al. .................. 353/69 |
| 2014/0098302 | A1 | 4/2014 | Rumreich |

FOREIGN PATENT DOCUMENTS

| | | |
|---|---|---|
| EP | 1646224 A1 | 4/2006 |
| EP | 1870766 A1 | 12/2007 |
| EP | 2271121 A2 | 1/2011 |
| JP | 3-081722 A | 4/1991 |
| JP | 2000-321531 A | 11/2000 |
| JP | 2006-072221 A | 3/2006 |
| JP | 2007-114767 A | 5/2007 |
| JP | 2008-089931 A | 4/2008 |
| JP | 2008-089934 A | 4/2008 |
| JP | 2009-198988 A | 9/2009 |
| JP | 2010-271433 A | 12/2010 |
| KR | 2008-050722 A | 6/2008 |
| TW | M298269 U | 9/2006 |
| WO | WO2010067354 A1 | 6/2010 |

OTHER PUBLICATIONS

Tsuruta et al., "An Advanced High-Resolution, High-Brightness LCD Color Video Projector," SMPTE Motion Imaging Journal, Society of Motion Picture and Television Engineers, White Plains, NY, vol. 101, No. 6, Jun. 1, 1992, pp. 399-403.

Van Den Brandt et al., "New plusfactors in an LCD-projector: homogeneous illumination, quick lamp (re-)start, reliable construction, full resolution NTSC," Proceedings of the International Display Research Conference, San Diego, CA, Oct. 15, 1991, vol. CONF.11, pp. 151-154.

Search Report Dated Nov. 2, 2012.

Search Report of PU110053 (Related Case) Dated Sep. 27, 2012.

* cited by examiner

VARIABLE AND SERRATED SCANNING IN LASER PROJECTORS

CROSS-REFERENCE TO RELATED APPLICATIONS

This application claims the benefit, under 35 U.S.C. §365 of International Application PCT/US2012/039408, filed May 24, 2012, which was published in accordance with PCT Article 21(2) on Dec. 6, 2012 in English and which claims the benefit of U.S. provisional patent application No. 61/520,067, filed Jun. 3, 2011, and this application relates to U.S. Provisional Application 61/520,068 filed Jun. 3, 2011.

FIELD OF THE INVENTION

The invention relates to miniature projectors and methods for operating miniature projectors.

BACKGROUND

Miniature laser projectors, which have been referred to as pico projectors, nano projectors, and micro projectors, are generally battery operated portable projectors that have been gaining popularity because their small size makes them convenient for certain applications. The devices can be connected to handheld devices or laptops and can display images on screens or walls.

Unfortunately, miniature laser projectors generally exhibit low light output, thereby limiting their utility to environments with low ambient background light. These laser-based units typical display power in the order of only 1 mW.

Maximum brightness for these devices can be increased by increasing the power of the output; however, such increases in power can be detrimental. From a health perspective, increases in laser power can augment the possibly of damage to eyes. From an operational perspective, increases in laser power can drain battery power rapidly and create excessive heat that must be dissipated to avoid damaging the laser diode or changing the operational performance.

Modulation of the horizontal scan velocity in the fast scan axis has been considered to improved peak bright in miniature displays, which had been incorporated in CRT displays to improve the apparent sharpness of edges; however, this was not used to increase brightness.

In conventional laser projectors, a moving micromirror is used to raster scan the laser beam in a manner that is analogous to the steering of electron beams in cathode ray tubes. The horizontal scan motion is created by running the horizontal axis at its resonant frequency, which is typically about 18 KHz. The horizontal scan velocity varies sinusoidally with position. A scan controller uses feedback from sensors on the scanner to keep the system on resonance and at a fixed scan amplitude. The image is drawn in both directions as the scanner sweeps the beam back and forth. This helps the system efficiency in two ways. First, by running on resonance, the power required to drive the scan mirror is minimized. Second, bi-directional horizontal scanning of video maximizes the laser use efficiency by minimizing the video blanking interval. Bi-directional implies that the laser is emitting light during both left and right sweeps of the laser beam (or up and down sweeps if the raster scan pattern is rotated). This results in a brighter projector for any given laser output power.

Figure 1:
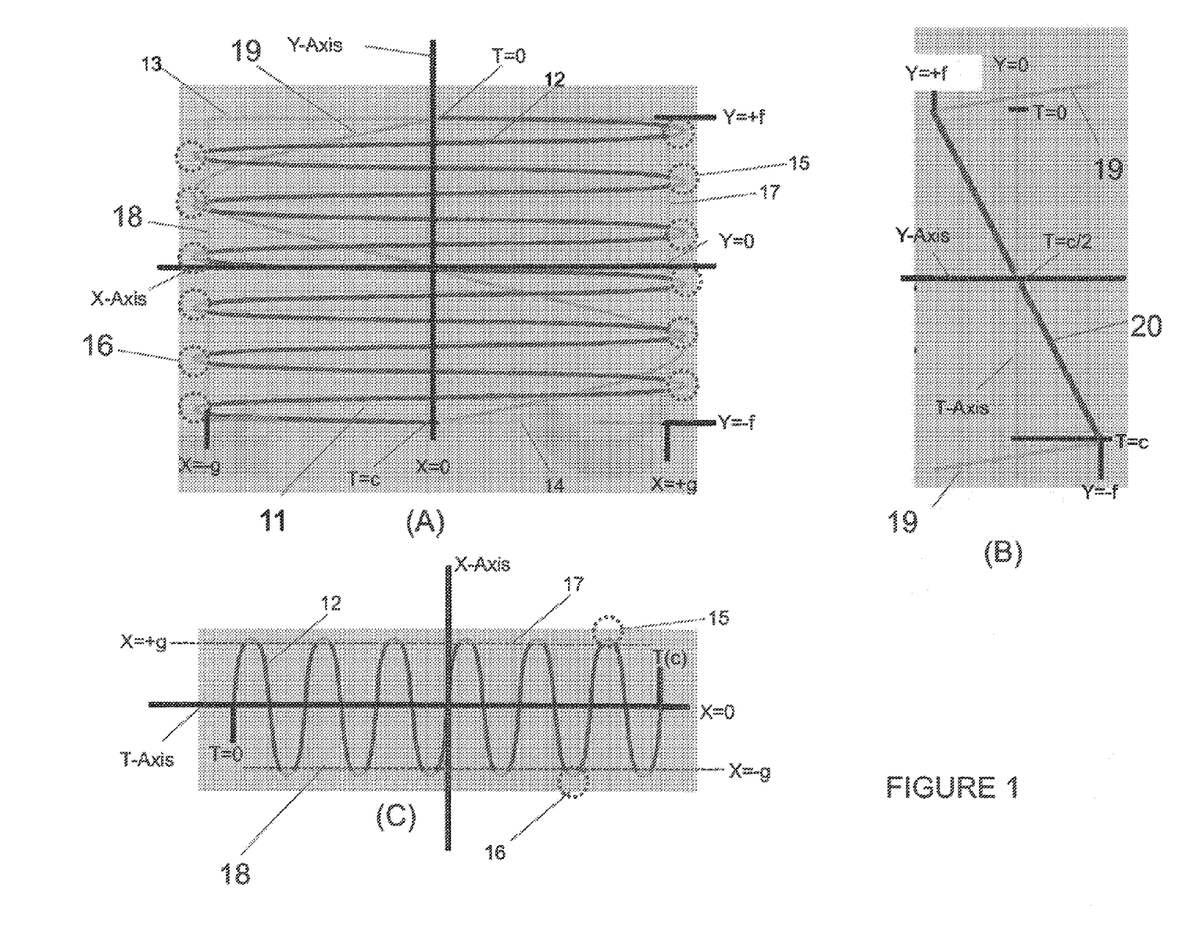
FIG. 1 shows views of a composite raster scan pattern and component vertical and horizontal scan patterns incorporated in the invention.

The vertical scan direction is traditionally driven with a standard sawtooth waveform to provide constant velocity from the top to the bottom of the image and a rapid retrace back to the top to begin a new frame as shown in FIG. 1. The frame rate is typically 60 Hz for an 848×480 WVGA resolution; it can be increased under some conditions or some particular application requirements.

In light of the limited utility of miniature laser displays and possible safety and performance concerns associated increasing laser power, a need exists to more optimally operate miniature laser displays.

SUMMARY OF THE INVENTION

A method is provided that comprise: receiving image data for an image to scan; generating light beams responsive to the image data; forming a horizontal scan profile to direct the light beams in which the horizontal scan profile comprises cycles having oscillating amplitudes that are substantially parallel to a first axis (X-axis) and substantially perpendicular to a second axis (Y-axis); forming a cyclic wobulation responsive to the cycles; forming a vertical scan profile that includes the cyclic wobulation; and scanning the light beams according to a wave pattern that is a composite of the vertical scan profile and the horizontal scan profile to form the image such that the light beams are driven vertically parallel to the second axis (Y-axis) from a first edge to an ending edge while oscillating horizontally parallel the first axis (X-axis). The method can further include generating a baseline vertical scan profile of motion along the second axis as a function of time; providing or selecting a cyclic wobulation profile of motion along the second axis versus time in which the cyclic wobulation profile comprises individual wobulation cycles in which one wobulation cycle corresponds to one half of a single wave of a wave pattern and another wobulation cycle corresponds to a second half of the single wave; and adding the cyclic wobulation profile to the baseline vertical scan profile to obtain the vertical scan profile. The baseline vertical scan profile can be a linear function and the wave pattern can comprise a series of single waves and the single waves can comprise a first half having a first half amplitude that oscillating in one direction along the first axis (X-axis) and a second half having a second half amplitude that oscillates in a second direction along the first axis (X-axis) that is opposite the one direction. The first half and second half of individual single waves can be symmetric about the second axis. Additionally, the method can comprise the steps of providing a baseline vertical scan profile of motion along the second axis as a function of time; providing or selecting a cyclic wobulation profile of motion along the second axis versus time, wherein the cyclic wobulation profiles comprise individual wobulation cycles in which one wobulation cycle corresponds to the first half of the single wave of the wave pattern and another wobulation cycle corresponds to the second half of the single wave; and adding the cyclic wobulation profile to the baseline vertical scan profile to obtain the vertical scan profile. The method can further include complete horizontal sweeps of the light beams on a viewing surface to form scan lines and the scan lines have an average absolute angle with respect to the first axis that is less than the an average absolute angle with respect to the first axis of scan lines that would correspond to scanning the beams using the baseline vertical scan profile.

Additional implementations of the invention can include employing a variable scan velocity values in the second axis, wherein the scan velocity values are responsive to brightness levels required for the image data. Further, embodiments can include the steps of forming scan lines on a viewing surface from complete horizontal sweeps of the light beams; and setting the scan velocity values to be inversely related to a total brightness levels required for complete scan lines that are oriented along the second axis.

The invention also can include embodiments to a miniature projector that comprises: a means for providing at least three different light beams of different color; and a means for scanning the light beams. The scanning means can be adapted to scan the light beams according to a pattern from a first edge to an ending edge in the screen to form an image, the pattern being a wave pattern of scan lines such that amplitudes oscillates along a first axis (X-axis) as the beams progressively scan along a second axis (Y-axis), the second axis being perpendicular to the first axis. Ideally the source of the beams can be positioned centrally in front of the screen such that the beams at the central portions of the screen are perpendicular to the screen; however, because systems incorporating the invention are generally mobile, the relational positioning can vary. In some cases, the source can be lower than the center of the screen, but can still be laterally centered. The wave pattern can be a composite of a vertical scan profile and horizontal scan profile and the vertical scan profile can have a cyclic wobulation corresponding to the amplitudes. In the miniature projector, the scanning means can be adapted to add a second harmonic wave pattern to a baseline vertical scan profile to make the vertical scan profile in which the second harmonic wave pattern is responsive to the horizontal scan profile.

BRIEF DESCRIPTION OF THE DRAWINGS

The invention will be explained in detail with reference to the drawings in which.

The FIG. 4 shows a block diagram of the system architecture according to the invention.

DETAILED DESCRIPTION OF THE EMBODIMENT(S)

To increase the peak brightness and maintain and/or improve image uniformity of miniature displays, which can be laser based or light emitting diode based, embodiments of the invention are disclosed that incorporate certain modulations of the scan velocity and/or serrated scanning patterns. The serrated scanning, which will be described in greater detail below, can generally be achieved by having some wobulation feature in the vertical and/or horizontal scan profiles, wherein wobulation implies some subtle oscillation in a dimension about a locus of points. Subtle oscillations implies that the wobulation motion is substantial smaller than or a fraction of the complete range of scan motion in the dimension.

An important consideration in the miniature display incorporated in the invention is that unlike in CRTs, which require a blanked horizontal retrace interval to produce a uniform horizontal scan pattern, a blanking horizontal retrace is not practical. The reason is a horizontal retrace during the actual image producing phase would reduce the effective display brightness by half. This is due to the fact that the retrace time for laser or LED beam is equal to the active scan time.

The invention can incorporate a single mirror, a micromirror, a collection of mirrors or micromirrors, or a fiber optic cable system having servo steering system mechanism to raster-scan the beams. It is important to note that although the term mirror will be mentioned throughout the specification, it is intended that other suitable means of scanning light beams are considered features of the invention which could include micromirrors, collections of mirrors, scannable fiber optic cables, and the like.

The horizontal scan motion is created by running the horizontal axis at its resonant frequency, which can be about 18 KHz. The horizontal scan velocity varies sinusoidally with position. It is also important to note that although the expressions horizontal and sinusoidally are used, it is intended that embodiments of the invention can be systems in which the raster scan is rotated and it is further intended that other wave patterns such as various zigzag configurations, sawtooth configurations, and other suitable transverse wave patterns are suitable embodiments with the understanding that the beams are intended to be scanned in both directions of wave cycles.

A scan controller of the mirror or mirror system can use feedback from sensors on the scanner to keep the system on resonance and at fixed scan amplitude. The image is drawn in both directions as the scanner sweeps the beam back and forth. This helps the system efficiency in two ways. First, by running on resonance, the power required to drive the scan mirror is minimized. Second, bi-directional scanning (i.e. projecting light during left and right sweeps) maximizes the beam use efficiency by minimizing the video blanking interval. This results in a brighter projector for any given laser or light output power.

The vertical scan direction can be driven with a standard sawtooth waveform to provide constant velocity from the top to the bottom of the image and a rapid retrace 19 back to the top to begin a new frame as shown in FIG. 1. The frame rate can be 60 Hz for an 848×480 WVGA resolution; the frame rate or resolution can be increased under some conditions or for some particular application requirements (e.g., in a system where particular frames of video are to be flashed or scanned multiple times). Views of a general raster scan pattern utilized by the invention are shown in FIG. 1. Specifically, FIG. 1A shows how the beams of light 12 of the projector are scanned by the mirror (or mirror system) across a screen or wall 11. In the particular example, FIG. 1A shows that the result of the mirror rotating horizontally across the X-axis and vertically along the Y-axis as a function of time in which T=0 can be a time in which the light 12 is first projected on the screen 11. Time T=0 can correspond to the top 13 of the screen as shown in FIGS. 1A and T=0 can begin at horizontal level Y=+f. T=c can correspond to the bottom 14 of the viewable screen and T=c can be at horizontal level Y=−f. FIG. 1A further shows that the mirror raster scans the beams 12 sinusoidally downward from Y=+f at T=0 to Y=−f at T=c which effectively completes an image of video for one frame or subframe of video data. The number of individual scans to the right and left of the beams can vary depending on the system requirements and/or characteristic such as the designed resolution and the number pixels for the display. Each individual full scan cycle can include an overscanned right blanking region 15 at the far right of the scan as the beam reaches the vertical right edge 17 of the screen at vertical position X=+g and an overscanned left blanking region 16 at the far left of the scan as the beam reaches the vertical left edge 18 of the screen at vertical position X=−g. The overscanned blanking regions are areas outside the viewable screen in which the beams are either not on or the beams are appropriately shielded. There can be overscanning at the bottom 14 and top 13 of the screen 11 in which the mirror is projected vertically to positions corresponding to beyond the viewable screen edges.

FIG. 1B shows the vertical component of the scan mirror and FIG. 1C shows the horizontal scan component 25 of the scan mirror. FIG. 1B shows how the mirror scans the beams downward from the top 13 of the screen at Y=+f at T=0 to the bottom Y=−f at T=c. In FIG. 1B, the vertical axis is the time axis and the horizontal axis is the Y-axis.

FIG. 1C shows how mirror oscillates the beams laterally right from center line X=0 at T=0 toward the right edge 17 and into the overscanned blanking region 15, then toward the left toward the left edge left 18, then toward the right edge 17, and so on until the beams reach center line X=0 at T=c. FIG. 1C also shows the overscanned blanking regions 16, 15, which are the projected positions beyond X=−g and X=+g to which the mirrors are directed at the extremes of the sinusoidal cycles.

With reference to FIG. 1B, it is important to point out that the slope of the vertical component is linear and is ideal if the intensity needed for a particular image frame of video is uniform through the frame. However, a key feature of the invention is the rate of the vertical component changes during a particular frame of video when the intensity needed for the particular frame is not uniform in that some areas require greater brightness than others. As such, technically when there is to be a brightness change from one lateral region to an adjacent lateral region, the second derivative of the Y position with respect to the time T will become non-zero and the slope of the Y position with respect to the time T will increase if brightness is to be reduced and will decrease if the brightness is to be decreased.

FIG. 2A shows an example expected scan line spacing of the color beams 12 of the projector 24 as they are scanned when using the vertical scan rate shown in FIG. 1B. The vertical scan here has a constant slope 20.

FIG. 2B in contrast shows how scan line spacing can be varied by intentionally varying the vertical scan velocity during different portion of a raster scan. In such a case, when greater brightness is required, the vertical rate component is slowed downed in regions which need greater brightness. When less brightness is required, the vertical rate component is increased. In this example, the middle lateral portion of the screen in FIG. 2B is a slow scan region 21 and this region is surrounded by two fast scan regions 22, thereby more efficiently supplying additional light to region 21 at the expense of regions 22.

Figure 2:
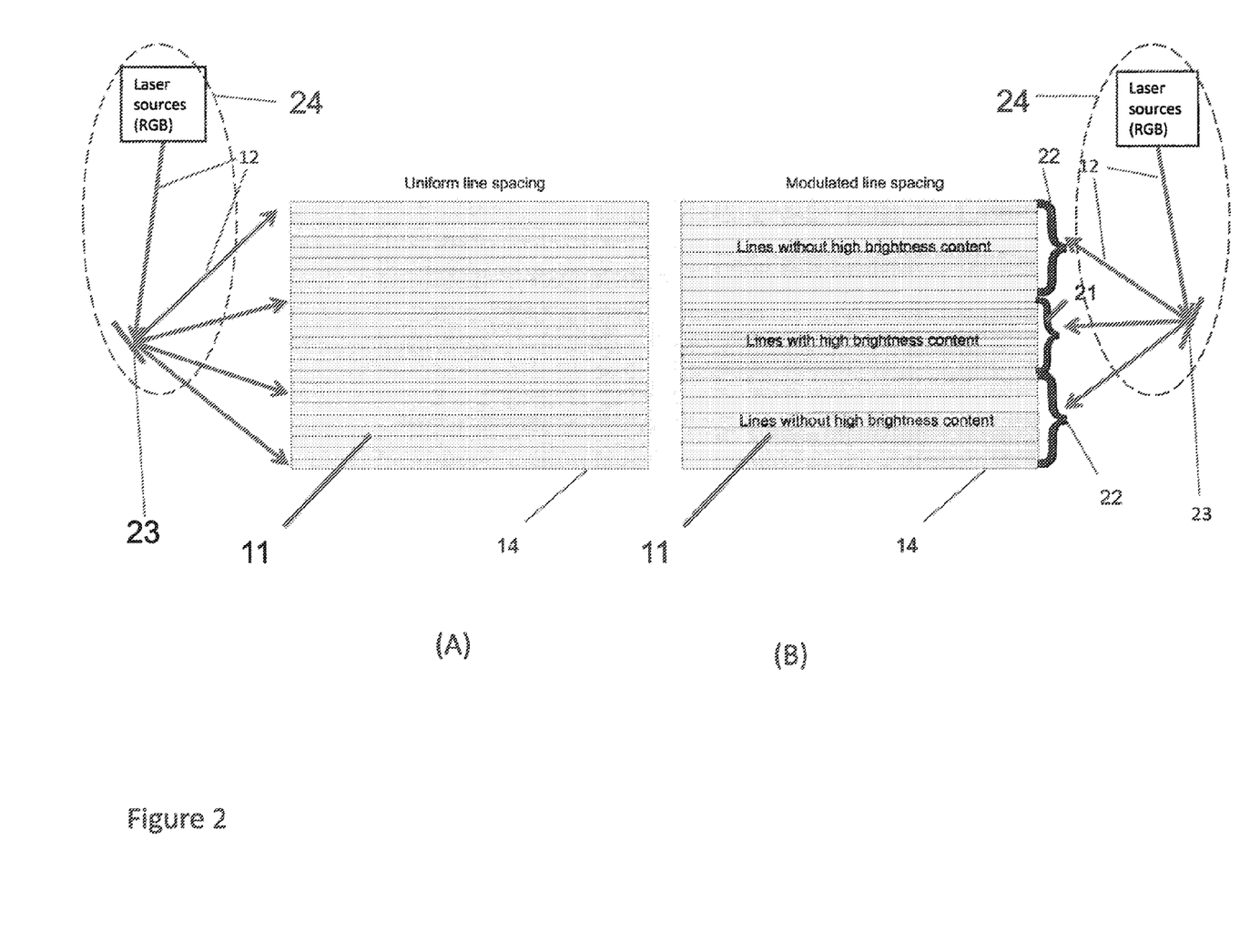
FIG. 2 shows views of raster scan patterns for a video image having a uniform brightness and a video image having non-uniform brightness.
Figure 3:
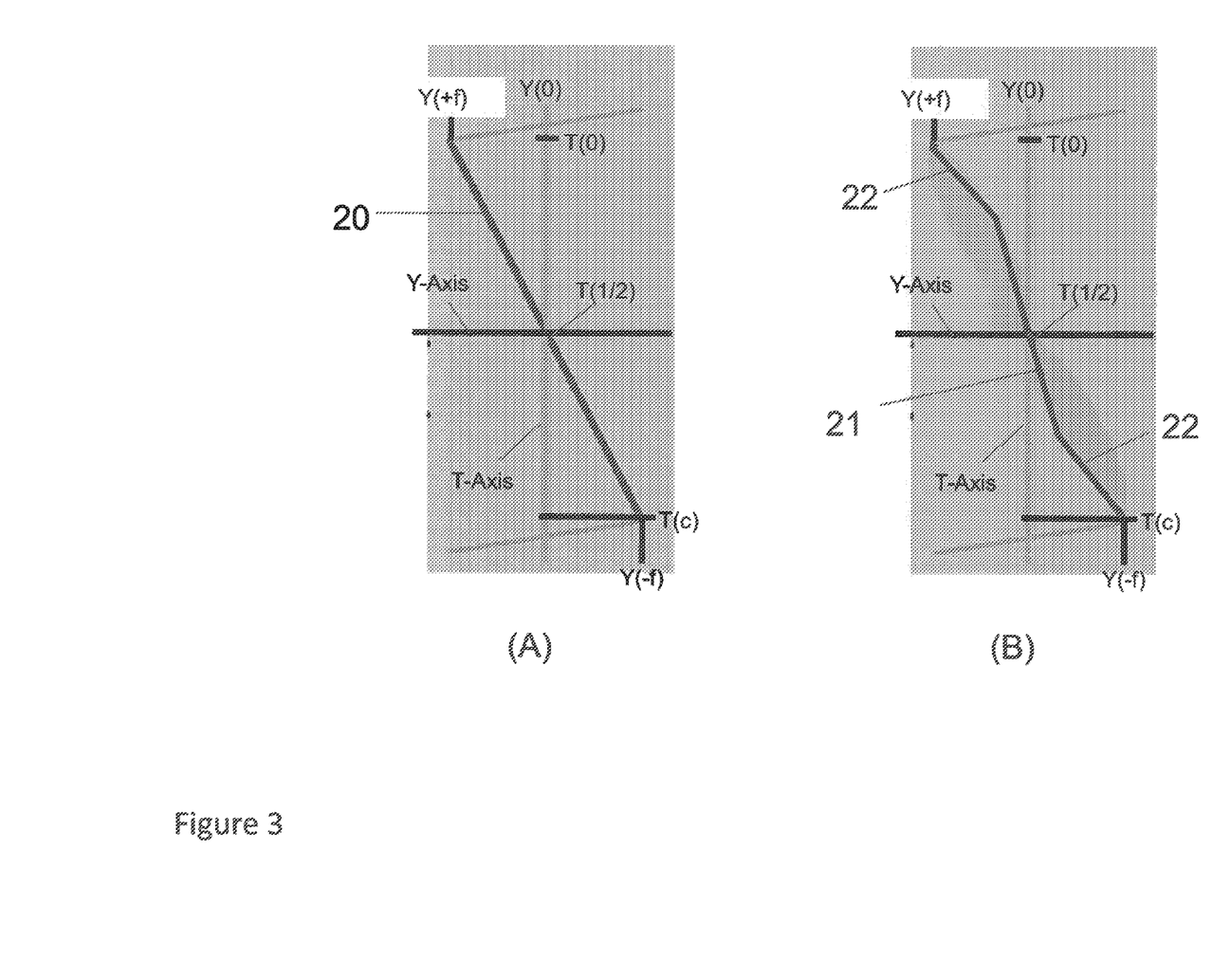
FIG. 3 shows component vertical scan patterns for a uniform brightness frame and a video image having non-uniform brightness frame.

FIGS. 3A and 3B show examples of the invention when one video frame requires a uniform brightness and another frame requires a non-uniform brightness. The vertical scan rate shown in FIG. 3A would produce the uniform scan line spacing result observed in FIG. 2A and vertical scan rates shown in FIG. 3B would produce the non-uniform scan line spacing result observed in FIG. 2B. FIG. 3B shows how the middle lateral portion of the screen in FIG. 2B can have a tight scan line spacing and how the upper and lower lateral portions have wider spacings. The spacing character in FIG. 2B is a result of having the slow scan region 21 surrounded by two fast scan regions 22 as shown in FIG. 3B. The fast scan implies that the slope of the vertical motion or displacement of the scan beam by the mirror with respect to time is larger than the constant or average vertical motion or displacement for a screen in which the scan line spacing is uniform throughout a frame of a screen. The slow scan implies that the slope of the vertical motion or displacement of the scan beam by mirror with respect to time is smaller than the constant or average vertical motion or displacement for a screen in which the scan line spacing is uniform throughout a frame of a screen.

In sum, the invention advantageously increases the peak brightness of the display by modulating the vertical scan velocity. More particularly, scan velocity modulation (SVM) to improve brightness is accomplished by forcing the laser beam to spend more time on the bright picture areas and less time on the dark picture areas.

It is important to point out the SVM can be performed horizontally and/or vertically. However, because the horizontal scan is high frequency and the scanning mechanism is mechanical, it is not generally practical and is presently difficult to implement horizontal SVM.

Please note that when mentioned in the context of this invention, the expression horizontal SVM is intended to mean some change in the horizontal scan velocity that will make the scan velocity deviate from the baseline horizontal trajectory character of the particular display. This means that the baseline horizontal trajectory character shown in FIG. 1C for the display, which does show some slight nonlinearity within the viewable screen region by design, is considered to have no horizontal SVM applied to it. There would have to be some slope changes with respect to the current slope character within one of the half cycles in FIG. 1C, which is responsive to brightness needs to consider the display to have horizontal SVM. Likewise it is feasible that the vertical baseline scan velocity could have some minor nonlinearity built into it for a number of reasons which could include the light sources not being laterally aligned with the screen or include geometrical peculiarities/requirements associated with beam shaping and/or screen shapes; and as such, vertical SVM is intended to mean there is some deviation in the slope of the vertical position with respect to time, which is responsive to brightness needs, from the baseline slope profile.

Although horizontal SVM can be utilized, the invention focuses more on the uses of vertical SVM, because the vertical scan component has a much lower frequency and has significantly more latitude for horizontal SVM. When vertical SVM is employed, the horizontal scan line spacing is modulated, as shown in FIG. 2B as opposed to FIG. 2A. FIG. 2B exaggerates the effect to show the principle. In practice, the modulation is limited to the extent that it prevents noticeable visibility of the scan line structure and to the extent that it prevents excessive degradation of resolution or degradation of vertical detail where scan line spacing is increased.

Figure 4:
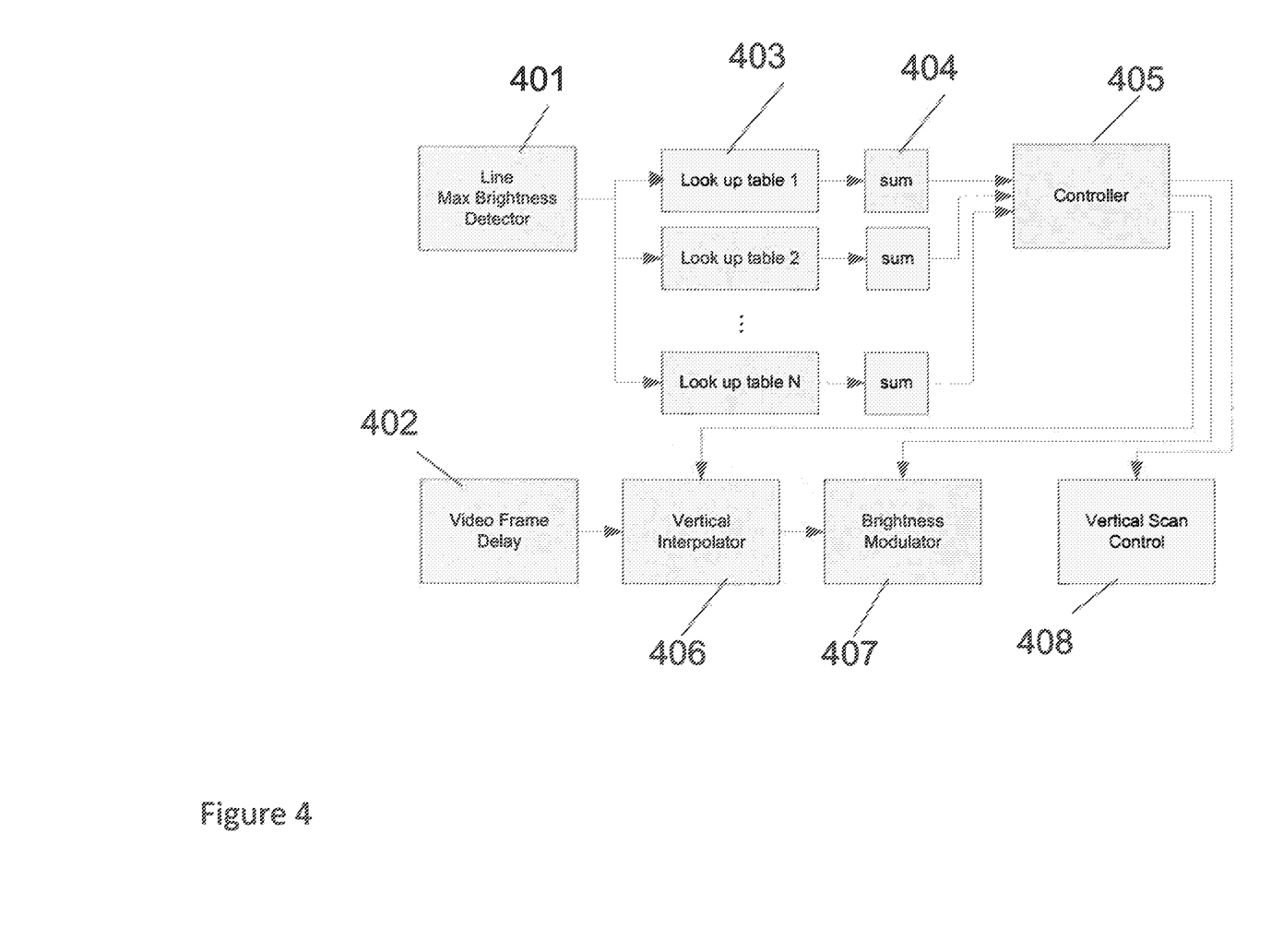

The FIG. 4 shows a block diagram of the system architecture for enhancing and more effectively obtaining desired peaked screen brightness. In this scheme, a line brightness detector 401 is employed to determine the maximum brightness value for each line of video. Input video is analyzed in detector 401 to determine the level of brightness needed for an individual line of video. The detector can use filtering to prevent giving too much weight to a single bright pixel. Blocks 403 of the architecture in FIG. 4 provide a set of look-up-tables. The function of each table is to map line brightness values to values indicative of desired line spacing or alternatively, desired line frequency. Multiple tables are used to provide multiple display profiles. For example, the individual look-up tables could each correspond to a different level of maximum brightness enhancement for the controller 405 to select. As such, for a given video frame, the system or controller 405 can calculate the temporal characteristics (such as total vertical scan time) and/or spacing characteristics (e.g. the collective scan line spacings) for scanning the image for the given frame associated with employing the specific look-up tables. The line spacing values associated with the implementation of each look-up table can be summed in sum block 404 to produce a frame total value for each display profile associated with each look-up table for the given frame. This summation in sum block 404 can effectively be the total vertical scan time needed to implement the parameters of the given look-up tables. The controller 405 can locate the frame total for the look-up table that most closely matches the target total or better matches the target total than at least another look-up table. This can mean that the controller 405 selects the look-up table of the available look-up tables that will produce the highest picture brightness (or produce a higher picture brightness than some other look-up table outputs) and yet allow all of the sweeps of the light beams to be completely scanned under the constraint of the fixed video frame rate. In other words, look-up tables that enhance brightness but require such changes in the vertical scan rates that cause too few or too many horizontal scans to occur and/or would require the fixed video frame rate to be reduced are not employed for that given frame. The controller 405 then implements the corresponding display profile in order to control the vertical interpolator 406 to properly place individual pixel positions on the screen.

With regards to the interpolator 406, it is important to point out that the scan lines or sweeps of the light beams are not fixed with respect to pixels for all frames on the screen for this invention. This is different than known projector systems in which the particular scan lines are dedicated to the same particular pixels on a viewing surface for all frames. Rather, in this invention, the light beam outputs are uniquely synchronized for different frames with the vertical and horizontal positioning of the mirror or scanning means such that the appropriate level of light in terms of chromaticity and luminosity are projected on the correct pixel locations on the screen as the light beams are scanned for a particular frame, wherein the physical locations and spacings of the specific scan lines vary from frame to frame and the pixels that the specific scan lines are intended to illuminate vary from frame to frame. For example, in one implementation of the invention, for one frame the fifth complete horizontal scan of the light beams can provide the needed light for 1st, 2nd, and 3rd pixels in the 8th row of screen pixels and for another frame the fifth complete horizontal scan of the light beams can provide the needed light for 1st, 2nd, and 3rd pixels in the 6th row of screen pixels.

Anyway, the controller 405 provides inputs to modulate the beams in the brightness modulator 407 and correspondingly drives the vertical scan control 408 to select the appropriate scan velocity modulation. The controller 405 and a video frame delay processor 402 are both used as inputs to the vertical interpolator 406. In order to keep the total number of display scan lines constant, scan lines that are displayed more closely together must be offset by scan lines that are displayed further apart. The video frame delay 402 can be employed to ensure that the controller 405 is given ample time to determine the best or better look-up table to employ and to determine the appropriate values or control signals to employ to the drive the system components for the given frame. Because the desired spacing per scan line is a nonlinear function of brightness, the look-up-tables can be used to determine the best balance of brightness enhancement.

The table below shows an example of a look-up-table representing a profile to double picture brightness.

| line max brightness (input) | brightness goal | laser max | scan line spacing (output) |
|---|---|---|---|
| 0 | 0 | 0 | 2.00 |
| 5 | 10 | 20 | 2.00 |
| 10 | 20 | 40 | 2.00 |
| 15 | 30 | 60 | 2.00 |
| 20 | 40 | 80 | 2.00 |
| 25 | 50 | 100 | 2.00 |
| 30 | 60 | 100 | 1.67 |
| 35 | 70 | 100 | 1.43 |
| 40 | 80 | 100 | 1.25 |
| 45 | 90 | 100 | 1.11 |
| 50 | 100 | 100 | 1.00 |
| 55 | 110 | 100 | 0.91 |
| 60 | 120 | 100 | 0.83 |
| 65 | 130 | 100 | 0.77 |
| 70 | 140 | 100 | 0.71 |
| 75 | 150 | 100 | 0.67 |
| 80 | 160 | 100 | 0.63 |
| 85 | 170 | 100 | 0.59 |
| 90 | 180 | 100 | 0.56 |
| 95 | 190 | 100 | 0.53 |
| 100 | 200 | 100 | 0.50 |

For a line with maximum brightness of 100, the line spacing would be 0.50 units, wherein 1.00 units is the line spacing dimension for uniform spacing of the horizontal scan lines. Thus, a spacing of 0.50 units doubles the effective brightness compared to known projector operating conditions. For lines with 25 or lower max brightness, the scan line spacing would be 2.00 and the laser intensity would need to quadruple to compensate for the combined double scan line height and double brightness goal. Depending on picture content, this profile may or may not provide a frame total that matches the target total. In cases where the frame total is insufficient, the picture brightness enhancement would need to be throttled back. In cases where the frame total is more than needed, the scan line spacing would be decreased proportionately across the frame. In either situation, look-up tables with profiles corresponding to these cases would be used to direct the controller. Note that in this example, the look-up table provides a scan line spacing output. In an alternative approach, the look-up table would provide a scan line frequency output.

Other look-up tables for example can provide an opportunity to effectively enhance the brightness by 1.25, 1.5, 3, or 4 times that for operating the system using the conventional non-variable scan rates. For example, other look-up tables could correspond to having 1.25 (brightness goal 125), 1.5 (brightness goal 150), 3 (brightness goal 300), and 4 (brightness goal 400) times enhancement and could have the scan line spacing minimum outputs at 0.80, 0.67, 0.33, and 0.25, respectively. For these other look-up tables, the brightness goal point where the scan line spacings begin to vary from 2.0 (output) can be at 60 as in the table above or could be at some other level and the specific values in between the largest scan line spacings and smallest scan line spacings can be scaled in a similar fashion as that in the table above. The one table shown above and the examples are merely illustrative of the concept of using the invention. Actual look-up tables can include more data and can incorporate different values.

In sum with regards to this feature of scan modulation, a miniature projector such as laser micro projector or light emitting diode micro projector is provided that improves brightness by employing scan velocity modulation of the mirror that scans the beams on the screen. To increase brightness, the laser beam or light spends more time on screen regions which are supposed to have higher brightness; consequently, the laser beam spends less time on screen regions which are supposed to be lower brightness regions. To keep the display height constant, scan lines which are more closely together are offset with scan lines displayed further apart. The system can have one mirror as shown in FIG. 2 or it can have a plurality of mirrors. Also, there can be a plurality of lasers each for a different primary color. Additionally, the disclosure can be characterized as a method of operating a miniature projector system having raster scanning mirror or mirrors: receiving an image having a predetermined target brightness for each region of the image to project; and raster scanning the image onto a screen with the mirror or mirrors such that the horizontal scan rate of the mirror is generally inversely proportional the target brightness for the regions.

Another characteristic of miniature projectors is the non-uniform scan pattern. This can often be the result of the concession made to improve brightness.

Figure 5:
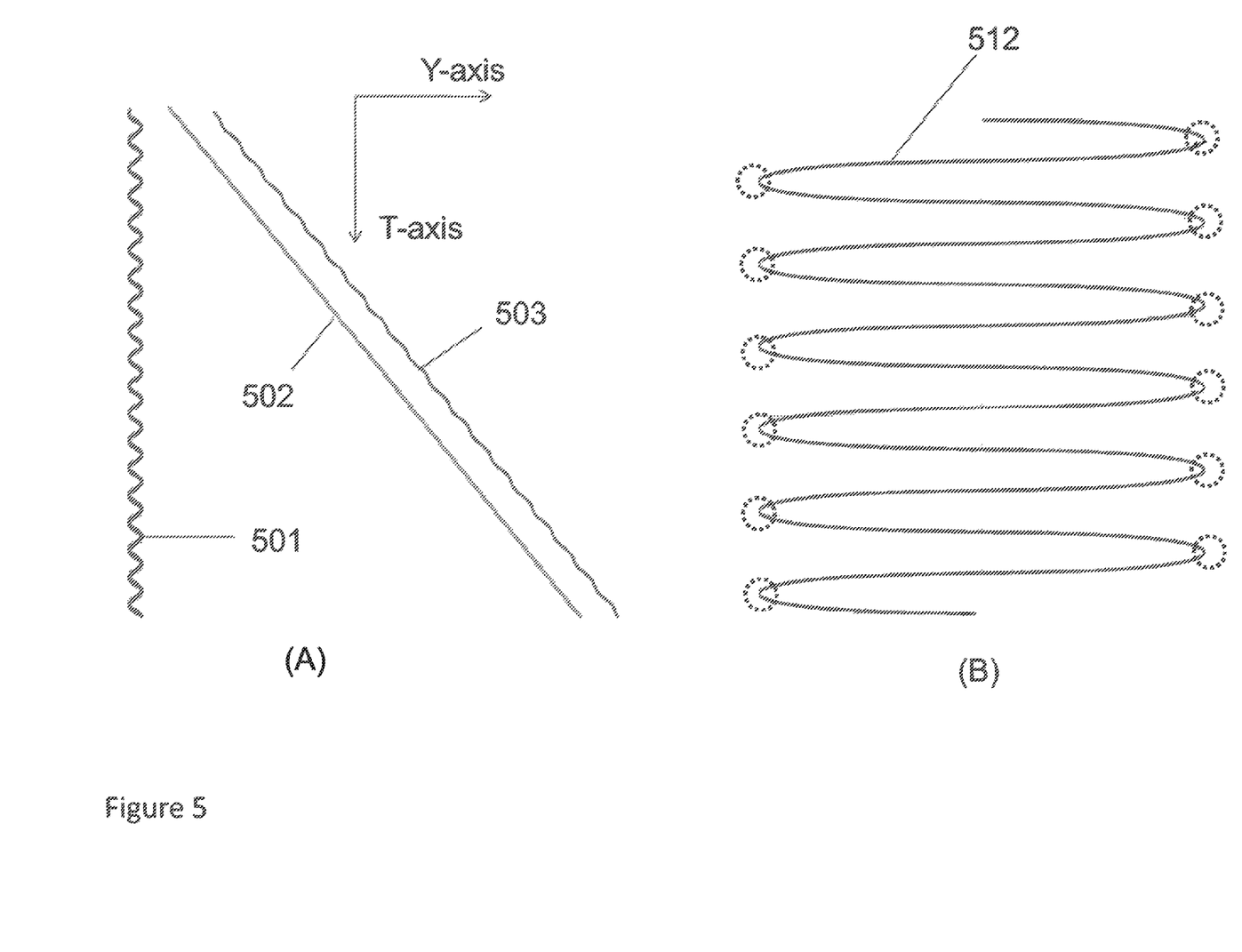
FIG. 5 shows a view of a serrated raster scan pattern according to the invention.

FIG. 5B shows a view of a serrated raster scan pattern 512 according to the invention. FIG. 5B shows that a serrated scan can produce left and right sweeps that are closer to parallel than the left and right scan sweeps without serration such as the scan shown in FIG. 1A. This can improve both brightness uniformity and resolution uniformity. The serrated scan can be accomplished by adding a small amount of wobulation 501 to the baseline vertical scan profile 502. This wobulation 501 can be the second harmonic of the horizontal-line frequency or the second harmonic of the horizontal scan profile in FIG. 1C. This may be achieved via the vertical scan modulation signal or through a secondary high frequency transducer coupled to the micro mirror assembly. This wobulation 501, which can be sinusoidal as shown in FIG. 5A, can be added to the baseline vertical scan component 502, to produce the resultant serrated resultant vertical scan pattern 503. This serrated vertical scan component 503 when run with the horizontal scan component in FIG. 1C produces the serrated raster scan 512.

Figure 6:
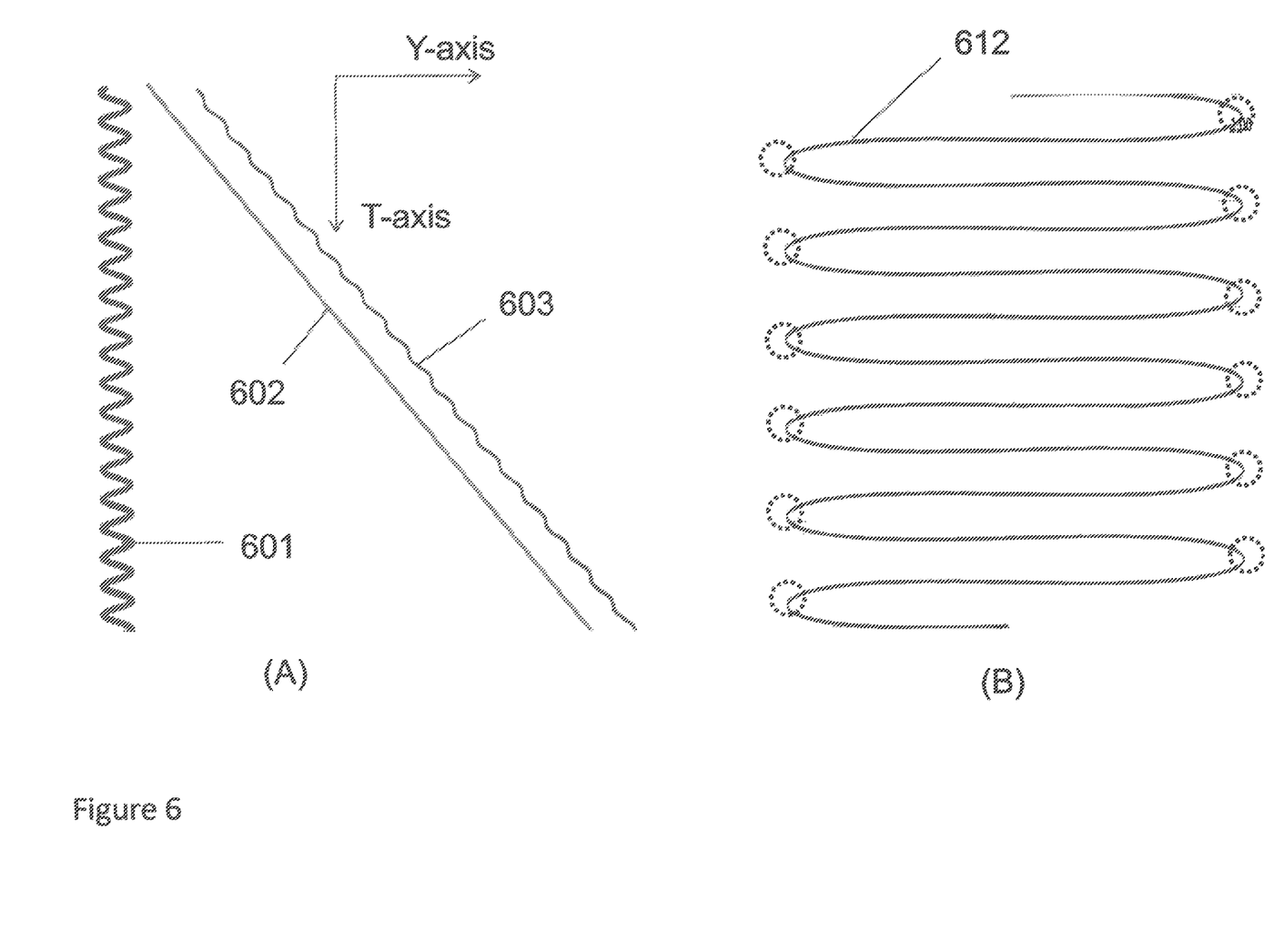
FIG. 6 shows another view of a serrated raster scan pattern according to the invention.

FIG. 6 shows addition example of serrated scanning in which the serration amplitude is changed by increasing the wobulation 601. This example again shows the use a second harmonic. The wobulation 601 is added to the baseline vertical scan component 602 to produce the resultant serrated vertical scan pattern 603. This serrated resultant vertical scan pattern 603 is then run with the horizontal scan component in FIG. 1C to produce the serrated raster scan 612.

Figure 7:
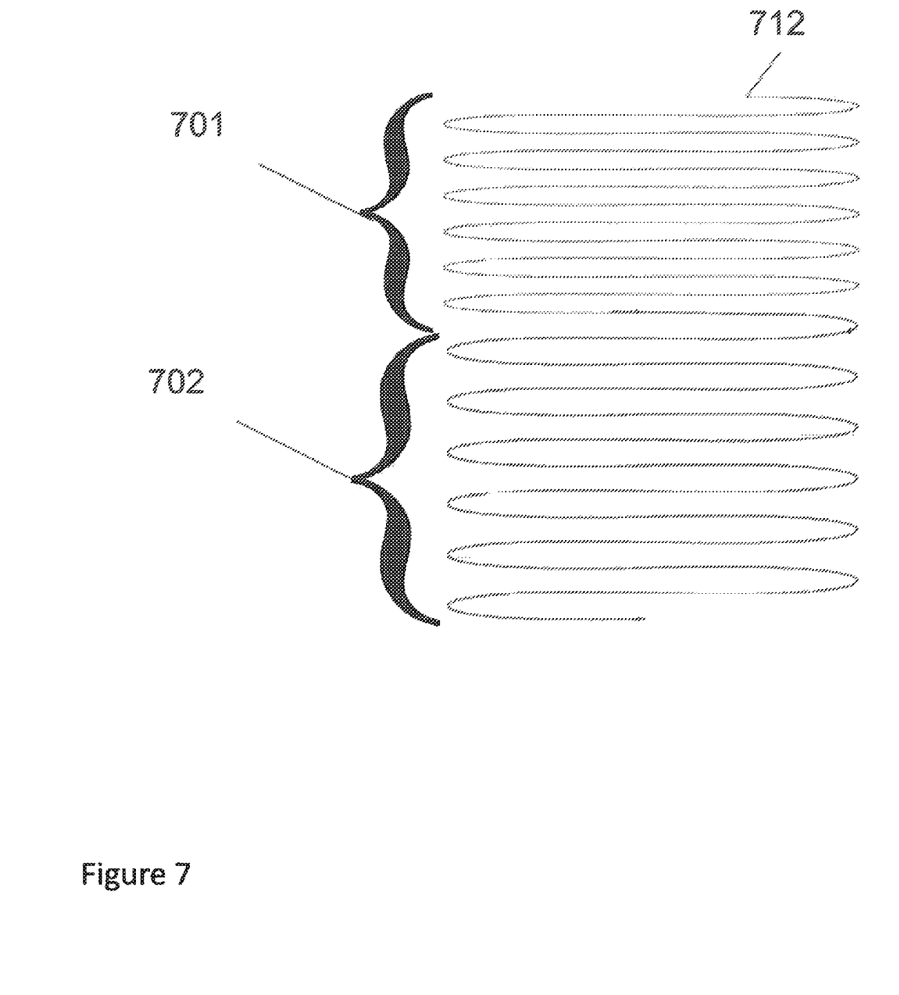
FIG. 7 shows the combination of serrated raster scanning with variable vertical scanning.

This second feature of the disclosure can be used alone or in conjunction with constant vertical velocity scanning or variable scanning in order to enhance display uniformity. FIG. 7 shows how the second feature can be combined with the variable vertical scan rate, wherein the vertical scan rate in a first screen location 701 is higher than the vertical scan rate in a second screen location 702 and the raster scan 712 of the light beams is serrated throughout the scan.

In sum, the second part of the invention can be characterized as a miniature projector that improves display/screen uniformity without reducing brightness by employing serrated raster scan.

It should be further pointed out that the second feature and first feature of the disclosure can be combined to increase brightness and yet maintain uniformity. In other words, the serration may correct for some of the distortions that may be created by the attempt to improve brightness by employing the variable scanning methodology.

Figure 8:
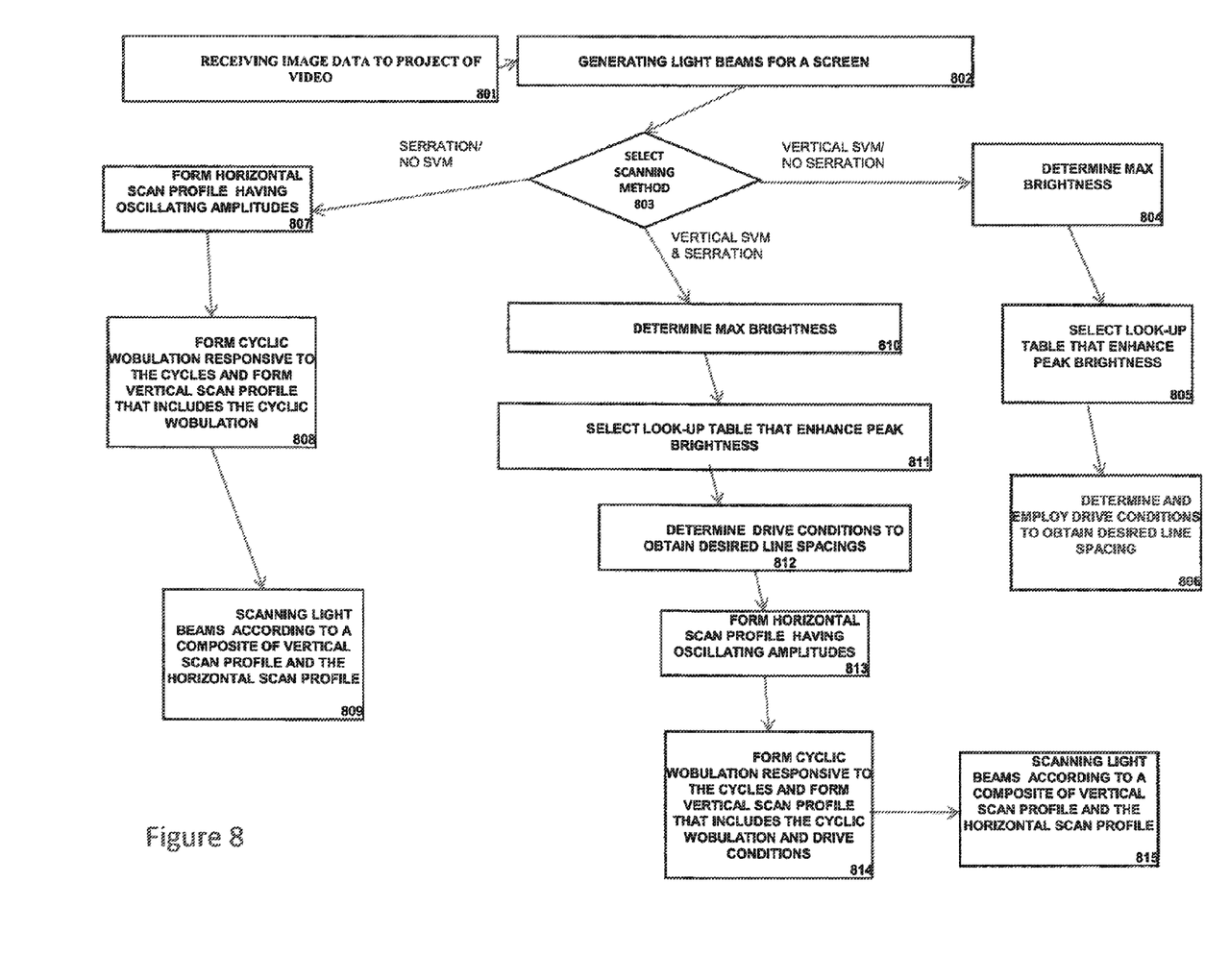
FIG. 8 is a flowchart representing various uses of the implementations of the invention.

FIG. 8 represents a flowchart for implementations of the invention. Block 801 represents the step receiving image data of a plurality of frames or subframes to project. Block 802 represents the step of generating multiple light beams 12, 12a, 12b from a source for projection unto a screen 11. Block 803 is a decision step for selecting whether to implement serration without scan velocity modulation, to implement serration with scan velocity modulation, or to implement scan velocity modulation without serration. If serration without scan velocity modulation is selected than one proceeds to block 807 which involves forming a horizontal scan profile of FIG. 1C to direct the light beams, wherein the horizontal scan profile comprises cycles having oscillating amplitudes that are substantially parallel to a first axis (X-axis) and substantially perpendicular to a second axis (Y-axis). A next block 808 can include forming a cyclic wobulation responsive to the cycles and forming a vertical scan profile (503) that includes the cyclic wobulation. Block 809 can represent the step of scanning the light beams 12a according to a wave pattern 512, 612 that is a composite of the vertical scan profile and the horizontal scan profile to form the image such that the light beams are driven vertically parallel to the second axis (Y-axis) from a first edge 13a to an ending edge 14a while oscillating horizontally parallel the first axis (X-axis).

If scan velocity modulation is selected without serration than one proceeds to block 804. Block 804 represents the step of analyzing the brightness characteristic for the individual frames or subframes of the video data, wherein the line brightness detector 401 is employed to determine the maximum brightness value for each line of video. The next block 805 represents the analysis and selection of the look-up tables 403 by the controller 405 in which the controller 405 can calculate the temporal characteristics (such as total vertical scan time) and/or spacing characteristics (e.g. the collective scan line spacings) for scanning the image for the given frame or subframe associated with employing the specific look-up tables. The line spacing values associated with the implementation of each look-up table can be summed in sum block 404 to produce a frame or subframe total value which can also be included in block 805. The next step is represented by block 806 and includes determining and employing the drive conditions for the light sources and the vertical and horizontal scan profiles. This step can involve employing variable scan velocity values in the second axis, assigning scan velocity values that are responsive to brightness level required for the image data, setting the scan velocity values to be inversely related to total brightness levels required for complete scan lines that are oriented along the second axis, and/or configuring the scan lines to be non-uniformly spaced responsive to brightness levels required for the image data, wherein the image data can comprise n number of complete frames of video and there are a fixed number of scan lines from one frame to another frame.

If scan velocity modulation is selected with serration than one proceeds to block 810. Block 810 represents the step of analyzing the brightness characteristic for the individual frames or subframes of the video data, wherein the line brightness detector 401 is employed to determine the maximum brightness value for each line of video. The next block 811 represents the analysis and selection of the look-up tables 403 by the controller 405 in which the controller 405 can calculate the temporal characteristics (such as total vertical scan time) and/or spacing characteristics (e.g. the collective scan line spacings) for scanning the image for the given frame or subframe associated with employing the specific look-up tables. The line spacing values associated with the implementation of each look-up table can be summed in sum block 404 to produce a frame or subframe total value which can also be included in block 811. The next step is represented by block 812 and includes determining the drive conditions for the light sources and the vertical and horizontal scan profiles for desired line spacings. This step can involve determining desired variable scan velocity values in the second axis, assigning scan velocity values that are responsive to brightness level required for the image data, having the scan velocity values to be inversely related to total brightness levels required for complete scan lines that are oriented along the second axis, and/or configuring the scan lines to be non-uniformly spaced responsive to brightness levels required for the image data, wherein the image data can comprise n number of complete frames of video and there are a fixed number of scan lines from one frame to another frame. The next block 813 is the step that involves forming a horizontal scan profile to direct the light beams, wherein the horizontal scan profile comprises cycles having oscillating amplitudes that are substantially parallel to a first axis (X-axis) and substantially perpendicular to a second axis (Y-axis). A next block 814 can include forming a cyclic wobulation responsive to the cycles and forming a vertical scan profile (503) that includes the cyclic wobulation. Block 815 can represent the step of scanning the light beams (12a) according to a wave pattern (512, 612) that is a composite of the vertical scan profile and the horizontal scan profile to form the image such that the light beams are driven vertically parallel to the second axis (Y-axis) from a first edge (13a) to an ending edge (14a) while oscillating horizontally parallel the first axis (X-axis).

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents. For example, although many of the features of the invention are described within the context of miniature projector, the invention is applicable to other projector systems.

The invention claimed is:

1. A method comprising:
   receiving image data for an image to scan;
   generating light beams responsive to the image data;
   forming a horizontal scan profile to direct the light beams, the horizontal scan profile comprises cycles having oscillating amplitudes that are substantially parallel to a first axis and substantially perpendicular to a second axis;
   forming a cyclic wobulation responsive to the cycles;
   forming a vertical scan profile that includes the cyclic wobulation; and
   scanning the light beams according to a wave pattern that is a composite of the vertical scan profile and the horizontal scan profile to form the image such that the light beams are driven vertically parallel to the second axis from a first edge to an ending edge while oscillating horizontally parallel the first axis;
   wherein variable scan velocity values are employed in the second axis.

2. The method of claim 1 comprising
   generating a baseline vertical scan profile of motion along the second axis as a function of time;
   providing or selecting a cyclic wobulation profile of motion along the second axis versus time, wherein the cyclic wobulation profile comprises individual wobulation cycles in which one wobulation cycle corresponds to one half of a single wave of a wave pattern and another wobulation cycle corresponds to a second half of the single wave; and
   adding the cyclic wobulation profile to the baseline vertical scan profile to obtain the vertical scan profile.

3. The method of claim 2 wherein the baseline vertical scan profile is a linear function.

4. The method of claim 2 comprising incorporating a second harmonic of the horizontal scan profile into the cyclic wobulation profile.

5. The method of claim 2 comprising employing at least three laser beams of different colors to generate the light beams.

6. The method of claim 5 comprising employing at least one scanning mirror to scan the three laser beams of different colors.

7. The method of claim 2 comprising employing at least three light emitting diodes to generate the light beams of different colors.

8. The method of claim 1 wherein the wave pattern comprises a series of single waves and the single waves comprise a first half having a first half amplitude that oscillating in one direction along the first axis and a second half having a second half amplitude that oscillates in a second direction along the first axis that is opposite the one direction.

9. The method of claim 8 wherein the first half and second half of individual single waves are symmetric about the second axis.

10. The method of claim 9 comprising
    providing a baseline vertical scan profile of motion along the second axis as a function of time;
    providing or selecting a cyclic wobulation profile of motion along the second axis versus time, wherein the cyclic wobulation profiles comprise individual wobulation cycles in which one wobulation cycle corresponds to the first half of the single wave of the wave pattern and another wobulation cycle corresponds to the second half of the single wave; and
    adding the cyclic wobulation profile to the baseline vertical scan profile to obtain the vertical scan profile.

11. The method of claim 10 wherein the baseline vertical scan profile is a linear function.

12. The method of claim 10 wherein the cyclic wobulation profile includes a second harmonic of the horizontal scan profile.

13. The method of claim 8 wherein complete horizontal sweeps of the light beams on a viewing surface form scan lines and the scan lines have an average absolute angle with respect to the first axis that is less than the an average absolute angle with respect to the first axis of scan lines that would correspond to scanning the beams using the baseline vertical scan profile.

14. The method of claim 1 comprises adding a second harmonic wave pattern to a baseline vertical scan profile to make the vertical scan profile, wherein the second harmonic wave pattern is responsive to the horizontal scan profile.

15. The method of claim 1 comprising assigning scan velocity values that are responsive to brightness levels required for the image data.

16. The method of claim 1 comprising:
    forming scan lines on a viewing surface from complete horizontal sweeps of the light beams; and
    setting the scan velocity values to be inversely related to a total brightness levels required for complete scan lines that are oriented along the second axis.

17. The method of claim 1 comprising:
    forming scan lines on a viewing surface from complete horizontal sweeps of the light beams; and
    assigning scan line spacing values responsive to brightness level required for the image data.

18. A miniature projector comprises:
a means for providing at least three different light beams of different color; and
a means for scanning the light beams;
wherein the scanning means is adapted to scan the light beams according to a pattern from a first edge to an ending edge in the screen to form an image, the pattern being a wave pattern of scan lines such that amplitudes oscillates along a first axis as the beams progressively scan along a second axis, the second axis being perpendicular to the first axis,
wherein the scanning means is further adapted to employ variable scan velocity values in the second axis, and
wherein the wave pattern is a composite of a vertical scan profile and horizontal scan profile and the vertical scan profile has a cyclic wobulation corresponding to the amplitudes.

19. The miniature projector of claim 18, wherein the scanning means is adapted to add a second harmonic wave pattern to a baseline vertical scan profile to make the vertical scan profile, wherein the second harmonic wave pattern is responsive to the horizontal scan profile.

20. A projector comprises:
a source of at least three different light beams of different color; and
a raster scanner to scan the light beams to a viewing surface;
wherein the light beams are steered in a pattern from a first edge to an ending edge in the screen to form an image, the pattern being a wave pattern of scan lines such that amplitudes oscillates along a first axis as the beams progressively scan along a second axis, the second axis being perpendicular to the first axis,
wherein the raster scanner is further adapted to employ variable scan velocity values in the second axis, and
wherein the wave pattern is a composite of a vertical scan profile and horizontal scan profile and the vertical scan profile has a cyclic wobulation corresponding to the amplitudes.

21. The projector of claim 20, wherein the raster scanner is adapted to add a second harmonic wave pattern to a baseline vertical scan profile to make the vertical scan profile, wherein the second harmonic wave pattern is responsive to the horizontal scan profile.

22. The projector of claim 20, wherein scan velocity values are responsive to brightness levels required for the image data used to form the image.

23. The projector of claim 20, wherein the source comprises at least three light emitting diodes to generate the light beams of different colors.

24. The projector of claim 20, wherein the raster scanner comprises at least one scanning mirror to scan the three laser beams of different colors.

25. The projector of claim 20, wherein the raster scanner:
generates a baseline vertical scan profile of motion along the second axis as a function of time;
provides or selects a cyclic wobulation profile of motion along the second axis versus time, wherein the cyclic wobulation profile comprises individual wobulation cycles in which one wobulation cycle corresponds to one half of a single wave of a wave pattern and another wobulation cycle corresponds to a second half of the single wave; and
adding the cyclic wobulation profile to the baseline vertical scan profile to obtain the vertical scan profile.

26. The projector of claim 25, wherein the baseline vertical scan profile is a linear function.

* * * * *